(12) United States Patent
Eze

(10) Patent No.: US 7,620,597 B2
(45) Date of Patent: Nov. 17, 2009

(54) ONLINE LOAN APPLICATION SYSTEM USING BORROWER PROFILE INFORMATION

(76) Inventor: Ike O. Eze, 220 4$^{th}$ St., Suite 200, Oakland, CA (US) 94607

( * ) Notice: Subject to any disclaimer, the term of this patent is extended or adjusted under 35 U.S.C. 154(b) by 75 days.

(21) Appl. No.: 11/787,485

(22) Filed: Apr. 16, 2007

(65) Prior Publication Data

US 2007/0244808 A1 Oct. 18, 2007

Related U.S. Application Data

(60) Provisional application No. 60/792,079, filed on Apr. 14, 2006.

(51) Int. Cl.
*G06Q 40/00* (2006.01)
(52) U.S. Cl. ........................................... 705/38
(58) Field of Classification Search ................... 705/35, 705/38–39; 707/1–7; 726/17–19
See application file for complete search history.

(56) References Cited

U.S. PATENT DOCUMENTS

| | | | | |
|---|---|---|---|---|
| 5,940,812 | A * | 8/1999 | Tengel et al. | 705/38 |
| 6,088,686 | A | 7/2000 | Walker et al. | |
| 7,181,427 | B1 * | 2/2007 | DeFrancesco et al. | 705/38 |
| 2003/0149659 | A1 | 8/2003 | Danaher et al. | |
| 2003/0172025 | A1 * | 9/2003 | Gallina | 705/38 |
| 2005/0289046 | A1 * | 12/2005 | Conyack, Jr. | 705/38 |
| 2006/0200396 | A1 * | 9/2006 | Satterfield et al. | 705/35 |
| 2006/0233332 | A1 * | 10/2006 | Toms | 379/114.2 |
| 2007/0198384 | A1 * | 8/2007 | Prouty | 705/35 |

OTHER PUBLICATIONS

Prouty, "Remote Accessible Information Processing for Consumer-to-Service Provider Transaction", U.S. Appl. No. 60/765,959, filed Feb. 7, 2006.*

* cited by examiner

*Primary Examiner*—Mary Cheung
(74) *Attorney, Agent, or Firm*—Courtney Staniford & Gregory LLP

(57) ABSTRACT

Embodiments of an online credit application system are described. The online credit application system displays a solicitation page requesting user credit score information and a selection of desired loan products. The user credit score information comprises a user's characterization of their own credit score. The system can be configured to obtaining the credit score for the user if the user does not provide the credit score in response to the solicitation. In response to the user's inquiry and information, the system displays a list of available loans based on the credit score and the selection of desired loan products. The user then selects a loan from the selection of desired loan products, after which the system requests user identification information to verify user qualification for the selected loan. Upon provisional qualification of the user for the loan product, the system obtains an actual credit score for the user based on detailed personal information of the user. It then transmits the user information to a lender and provides a transaction reference number to the user.

11 Claims, 17 Drawing Sheets centrro
rapid results

600

Your Offer Summary
See all offers for: Home Loans - Auto Loans - Credit Cards

Based on your credit score of 700, the following are offers you would qualify for.   602

Try another score: [        ] [submit]

Top Home Loans    604

| Name | Description | Finance Rate | |
|------|-------------|--------------|---|
| Wells Fargo Bank | ‣ No points, no bank origination fees at application<br>‣ Instant response when you apply online<br>‣ Free online access to your account | 7.50% | 610 |
| Wells Fargo Bank | ‣ Serving all 50 states through 2,400+ mortgage and Wells Fargo banking stores, and the Internet.<br>‣ USA's #1 retail home mortgage lender<br>‣ Services more than $1 trillion in mortgages for 5.1 million customers nationwide | 5.95% | |

See more Home Loan offers

Top Auto Loans    606

| Name | Description | Finance Rate | |
|------|-------------|--------------|---|
| E-Loan | ‣ No Hidden Costs.<br>‣ Trusted, personal service.<br>‣ The low rates you deserve. | 6.49% | |
| Wells Fargo Bank | ‣ Trusted lender for over 150 years.<br>‣ Indirect auto financing and vehicle leasing through relationships with more than 20,000 franchised auto dealers in North America.<br>‣ No closing costs. | 6.36% | |

FIG. 6A

See more Auto Loan offers

Top Credit Cards 608

| Name | Description | Finance Rate | |
|---|---|---|---|
| The Volkswagen Platinum Visa Card | • Earn 2 points for every dollar spent on Volkswagen products.<br>• Earn 1 point for every dollar spent on all other purchases.<br>• Large catalog of rewards you can redeem your points on. | 14.49% | |
| Citi Home Rebate Platinum Select MasterCard | • 0 balance transfers for the first 12 months.<br>• NO CAP or limits on the amount of rebates you can accumulate in a year.<br>• $0 liability for unauthorized charges - even when shopping online. | 11.49% | |

See more Credit Card offers

Privacy Policy | Terms of Use | Affiliate Marketing | Contact Us
Copyright © 2004 Centro, Inc. All Rights Reserved

FIG. 6B

FIG. 7 centrro
rapid results

800

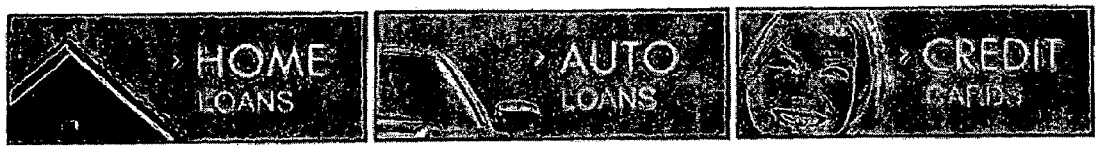

Congratulations!

| Wells Fargo Bank | 802 |
| Apply Now | |

We have verified that you qualify for the above offer. Click on the "Apply Now" link above to apply at our partner's website.

Below are additional offers that we have qualified you for. 804

Chase PerfectCard
Apply Now

See more Credit Card offers
that you qualify for

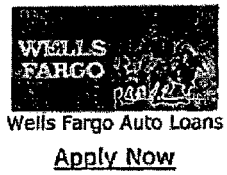
Wells Fargo Auto Loans
Apply Now

See more Auto Loan offers
that you qualify for

E-Loan Home Loans
Apply Now

See more Home Loan offers
that you qualify for

Privacy Policy | Terms of Use | Affiliate Marketing | Contact Us
Copyright © 2006 Centrro, Inc. All Rights Reserved

Credit Card Application     CHASE

Read Privacy Policy and Pricing and Terms for important information about rates, fees and other costs before applying.

🔒 All application pages are secure.

* indicates a required field.

Application Information

Before completing the application, you should be able to answer "Yes" to the following statements by checking the boxes:

☐ Yes, my credit history is clear of bankruptcy.

☐ Yes, my credit history is clear of seriously delinquent accounts.

☐ Yes, I have NOT been denied credit by Chase within the last 6 months.

Please Tell Us About Yourself

Your entries must consist of alpha-numeric characters only (e.g., characters such as "~", "$", "#", and commas will not be accepted in some fields).

Name: Title [ ] First* (Required) [ ] M.I. [ ] Last* (Required) [ ] Suffix [ ]

NOTE: Your name will appear on your card as depicted above.

Residential Address Line 1:* [ ]     Unit/Apt #: [ ]

Residential Address Line 2: [ ]

City:* [ ]     State:* [ ]

Zip Code:* [ ].[ ]     Home Phone:* [ ].[ ].[ ]

You must be a U.S. resident to apply. No P.O. boxes please.

Lived There:* [ ] Years [ ] Months

SSN:* [ ].[ ].[ ]   Why do we ask for this?

Date of Birth:* [ ]/[ ]/[ ] (MM/DD/YYYY)

FIG. 9A

Mother's Maiden Name: [ ]  Why do we ask for this?

E-mail Address: [ ]

Please Tell Us About Your Job (If retired, note previous employer. If self-employed, note nature of business.)

Employer: [ ]  Position: [ ]

Worked There: [ ] years [ ] months

Work/Alternate Phone: [ ] [ ] [ ]

Please Provide Some Financial Information

Alimony, child support, or separate maintenance income need not be revealed if you do not wish it to be considered as a basis for repaying this obligation.

Annual Household Income: $ [ ] .00 *(Please do not use commas.)*

Please select the type(s) of bank account(s) you have: [ ]

Select Residence: [ ]

Monthly Rent or Mortgage: $ [ ] .00 *(Please do not use commas.)*

Authorization

By submitting this application, I agree to the following:

- Everything I have stated in my application is true and correct.
- I have read and agree to all the pricing and other terms on the previous pages and screens.
- By using the account or any card, or authorizing their use, I agree to the terms of the Cardmember Agreement that I will receive with my card(s).
- The terms of my account, including the APRs, are subject to change. Any such changes will be made in accordance with the Cardmember Agreement.

FIG. 9B centrro
rapid results

How It Works | Who We Are

Your Offer Summary
See all offers for: Home Loans - Auto Loans - Credit Cards

Based on your credit score of 550, the following are offers you would qualify for.
Try another score: [_____]

Top Home Loans
| Name | Description | Finance Rate |
|------|-------------|--------------|

See more Home Loan offers

Top Auto Loans
| Name | Description | Finance Rate |
|------|-------------|--------------|
| Bank of America | • Competitive rates and flexible terms.<br>• Dedicated customer service representatives.<br>• Fast, easy online application. | 7.25% |

See more Auto Loan offers

Top Credit Cards
| Name | Description | Finance Rate |
|------|-------------|--------------|

See more Credit Card offers

FIG. 10

FIG. 12 centro

- Home
- About
- Contact

1300

Step 1 of 2: Qualify

You're on your way!

- Please provide us with some additional information so we can qualify you for this offer.

What is your annual gross income?  1302
$

How will you report your income?
[ Stated ]

How will you report your assets?
[ Stated ]

What are your monthly debt payments?

Do not include housing payments like rent or other mortgage payments.

$

Have you had a bankruptcy?

If so, how long ago?

[ No bankruptcies ]

Have you had a foreclosure?

If so, how long ago?

[ No foreclosures ]

What is the purpose of your property?
[ - Select - ]

What type of property do you have?
[ - Select - ]

[ Go Back ]  [ Continue ]

FIG. 13 centro 1400

- Home
- About
- Contact

Step 2 of 2: Apply

Congratulations! We have determined that you will probably be approved for this offer.

- Please fill out the following information to apply for this offer (learn about Centro's commitment to your privacy).
- A representative will contact you shortly to continue the application process.

What is your current interest rate?
[    ] %
What is your current loan type?
[    ]

First Name       1402
[    ]
Last Name
[    ]

Current Address
[    ]
Address Line 2 (optional)
[    ]
City
[    ]
State
[- Select State -  ▼]
ZIP Code
[    ]

Email Address
[    ]
Phone Number
( [  ] ) [  ] - [  ] ext. [  ]

[Go Back]  [Submit]

FIG. 14

1500

- Home
- About
- Contact

Confirmation

Thank you for using Centrro!

We have sent your information to this lender. You should be contacted by a representative to continue the application process.

Your reference number is: 735X1512 —— 1502

Want to get another NO OBLIGATION quote? Click the following link to return to your search results and choose an additional lender.

©2007 Centrro, Inc. All Rights Reserved
Contact | Privacy Policy | Terms of Use | Affiliate Marketing | Blog

FIG. 15

ONLINE LOAN APPLICATION SYSTEM USING BORROWER PROFILE INFORMATION

CROSS-REFERENCE TO RELATED APPLICATIONS

The present application claims the benefit of the U.S. Provisional Application No. 60/792,079 entitled "Online Loan Application System Using Borrower Profile Information," and filed on Apr. 14, 2006.

FIELD

Embodiments of the invention relate generally to electronic commerce systems, and more specifically, to online loan and credit application systems.

BACKGROUND

A multitude of different loan products and credit cards are available to borrowers. A person's ability to obtain loans or credit cards at favorable rates and terms, however, depends on that person's credit score, as well as other possible criteria. Generally a credit score reflects a person's creditworthiness and is expressed as a number that represents a risk level to a lender. The higher the credit score, the more creditworthy a person is. A high credit score generally allows a person to borrow money at better rates and under better terms. Financial institutions typically offer many different loan or credit products depending upon the financial profile of the borrowers. Under present loan application systems, a borrower must typically shop for a loan by making inquiries to the different financial institutions or shop through loan brokers. Such a process is typically very time consuming and often does not give the borrower a complete picture of what is available. With the advent of web-based processes, online systems for shopping for loans have become available. These systems however, may only provide only a general selection of loan products that are available and not an accurate selection of products based on the qualifications of the borrower. Moreover, such systems may require that the lender or broker pull the borrowers credit report. If a person uses such a system to shop among a variety of different products, this can adversely affect the person's credit rating since multiple credit report pulls can lower the person's credit rating.

BRIEF DESCRIPTION OF THE DRAWINGS

Embodiments of the present invention are illustrated by way of example and not limitation in the figures of the accompanying drawings, in which like references indicate similar elements and in which:

FIGS. 6A and 6B illustrate an example of a web page listing possible loans for a credit score of 700, according to an embodiment;

FIG. 7 illustrates an example of a qualification web page for a loan product listed in FIG. 6A, according to an embodiment;

FIG. 8 illustrates an example of an application web page for the loan product illustrated in FIG. 7;

FIGS. 9A and 9B illustrate an example of a web page for the vendor of a loan product, under an embodiment;

FIG. 10 illustrates an example of a web page listing possible loans for a credit score of 550, according to an embodiment;

FIG. 12 illustrates an example of a web page for applying for and selecting loan products, according to an alternative embodiment;

FIG. 13 illustrates an example of a qualification web page for a loan product listed in FIG. 12, according to an embodiment;

FIG. 14 illustrates an example of an application web page for the loan product illustrated in FIG. 13; and FIG. 15 illustrates an example of a confirmation page for the loan product illustrated in FIG. 14.

DETAILED DESCRIPTION

Figure 1:
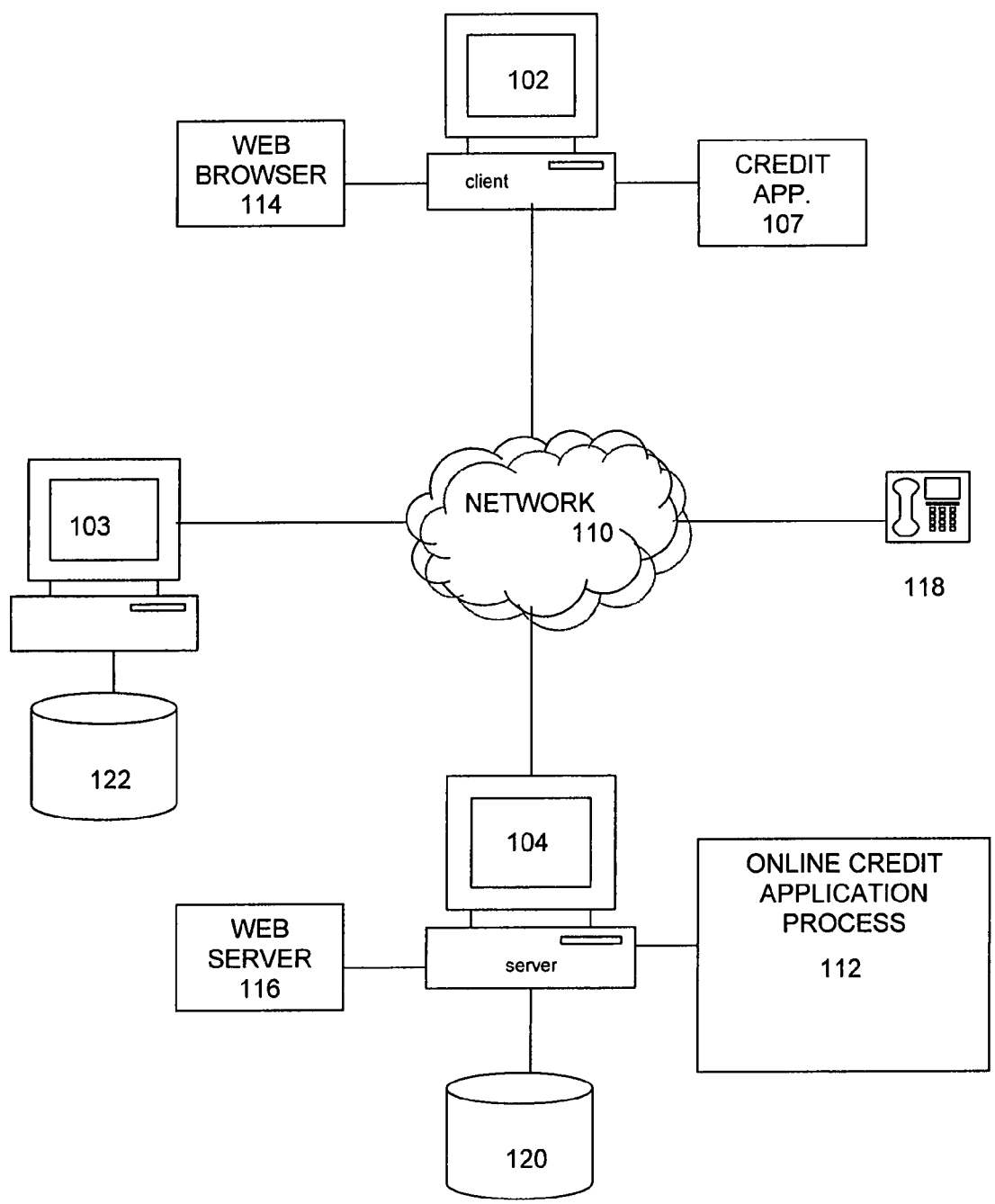
FIG. 1 is a block diagram of a computer network system that implements embodiments of an online credit application system.

Embodiments of an online credit application system are described. Aspects of the one or more embodiments described herein may be implemented on one or more computers executing software instructions. The computers may be networked in a client-server arrangement or similar distributed computer network. FIG. 1 illustrates a computer network system 100 that implements one or more embodiments. In system 100, a network server computer 104 is coupled, directly or indirectly, to one or more network client computers 102 through a network 110. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

In one embodiment, the server computer 104 is a World-Wide Web (WWW) server that stores data in the form of web pages and transmits these pages as Hypertext Markup Language (HTML) files over the Internet 110 to the client computer 102. For this embodiment, the client computer 102 typically runs a web browser program 114 to access the web pages served by server computer 104 and any available content provider or supplemental server 103.

In one embodiment, server 104 in network system 100 is a server that executes a server side online credit application process 112. Client versions of this process 107 may also be executed on the client computers. This process may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the online credit application process 112 may be implemented in a plurality of different program modules, each of which may be executed by two or more distributed server computers coupled to each other, or to network 110 separately.

For an embodiment in which network 110 is the Internet, network server 104 executes a web server process 116 to provide HTML documents, typically in the form of web pages, to client computers coupled to the network. To access the HTML files provided by server 104, client computer 102 executes a web browser process 114 that accesses web pages available on server 104 and other Internet server sites, such as content provider 103 (which may also be a network server executing a web server process). The client computer 102 may access the Internet 110 through an Internet Service Provider (ISP). Data for any of the loan products, credit card products, debt products, user information, and the like may be provided by a data store 120 closely or loosely coupled to any of the server 104 and/or client 102. In one embodiment, the client computer may execute a client side credit application program 107 to interact with the server-side online credit application process 112. A separate content provider 103 may provide some of the data that is included in the product offering or application process.

The client computer 102 may be a workstation computer or it may be a computing device such as a notebook computer, personal digital assistant, or the like. The client computer may also be embodied within a mobile communication device 118, game console, media playback unit, or similar computing device that provides access to the Internet network 110 and a sufficient degree of user input and processing capability to execute or access the client-side credit application program 107. The client computers 102 and 118 may be coupled to the server computer 104 over a wired connection, a wireless connection or any combination thereof.

Figure 2:
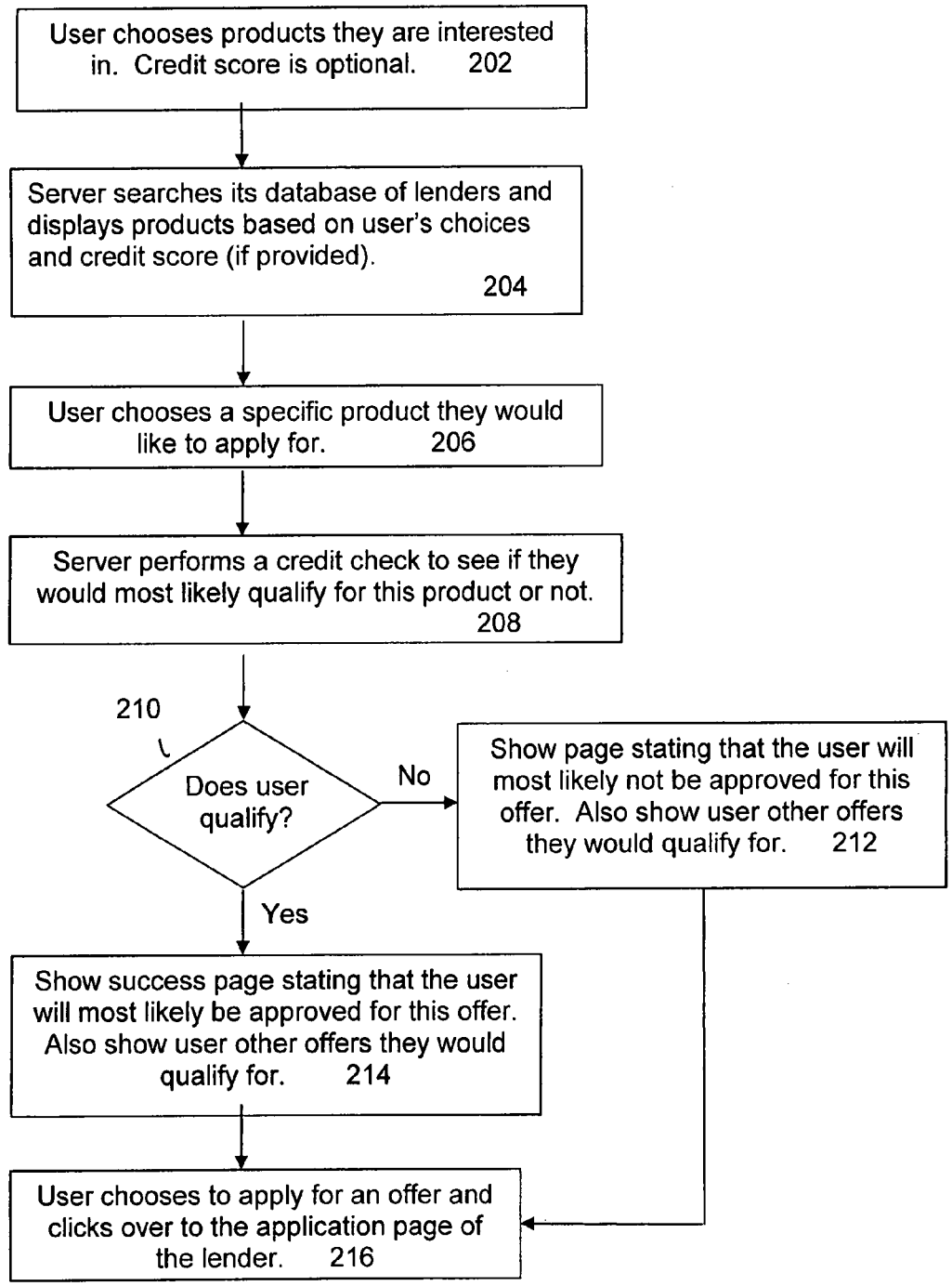
FIG. 2 is a flowchart that illustrates a method finding and displaying loan products for a user, according to an embodiment.

In one embodiment an online credit application system 112 facilitates the loan selection and application process through the display of loan application interfaces to a user. FIG. 2 is a flowchart that illustrates a method of finding and displaying loan products for a user, according to an embodiment. For the embodiment of FIG. 2, a loan application form is displayed on the client computer. In block 202, the user chooses the loan product that he or she is interested in. At this stage the user may provide his credit score, if it is known. The online credit application process 112 on server 104 searches its databases of lenders and displays products available on the user's choice and eligibility based on the credit score, if it was provided, block 202. The user then selects a specific loan product to apply for, block 206. In block 208 the server performs a credit check to verify whether or not the user qualifies for the selected loan product. If in block 210 it is determined that the user does qualify for the selected loan product, the server displays a success page stating that the user will most likely be approved for the loan offer. The server may also display other loan products that the user would qualify for, block 212. In block 216, the user applies for the loan and then accesses the application of the lender. If, in step 210 it is determined that the user does not qualify for the selected loan product, the server displays a page indicating that the user would probably not be approved for the selected offer. It then displays other loan products that the user might be approved for.

In one embodiment, the server computer 104 has access to a wide variety of different loan products available from any number of commercial or private lenders or financial institutions. Typically these products are accessed through a variety of networks and stored in databases maintained by these lenders. Alternatively, these products may be consolidated and stored in a single (or virtually single) database that is accessible to the server, such as on a data store 120 or data store 122 maintained by a separate server 103.

For the embodiment of FIG. 2, a credit score is provided to the server so that the appropriate loan products can be displayed for selection by the user based on eligibility of the user. This credit score information can be provided to the system directly by the user, or alternatively it can be obtained by the server, from a third party service, based on information provided by the user. This is illustrated as step 208 in FIG. 2, and at least two different credit pull process flows are possible, as illustrated in FIGS. 3 and 4.

Figure 3:
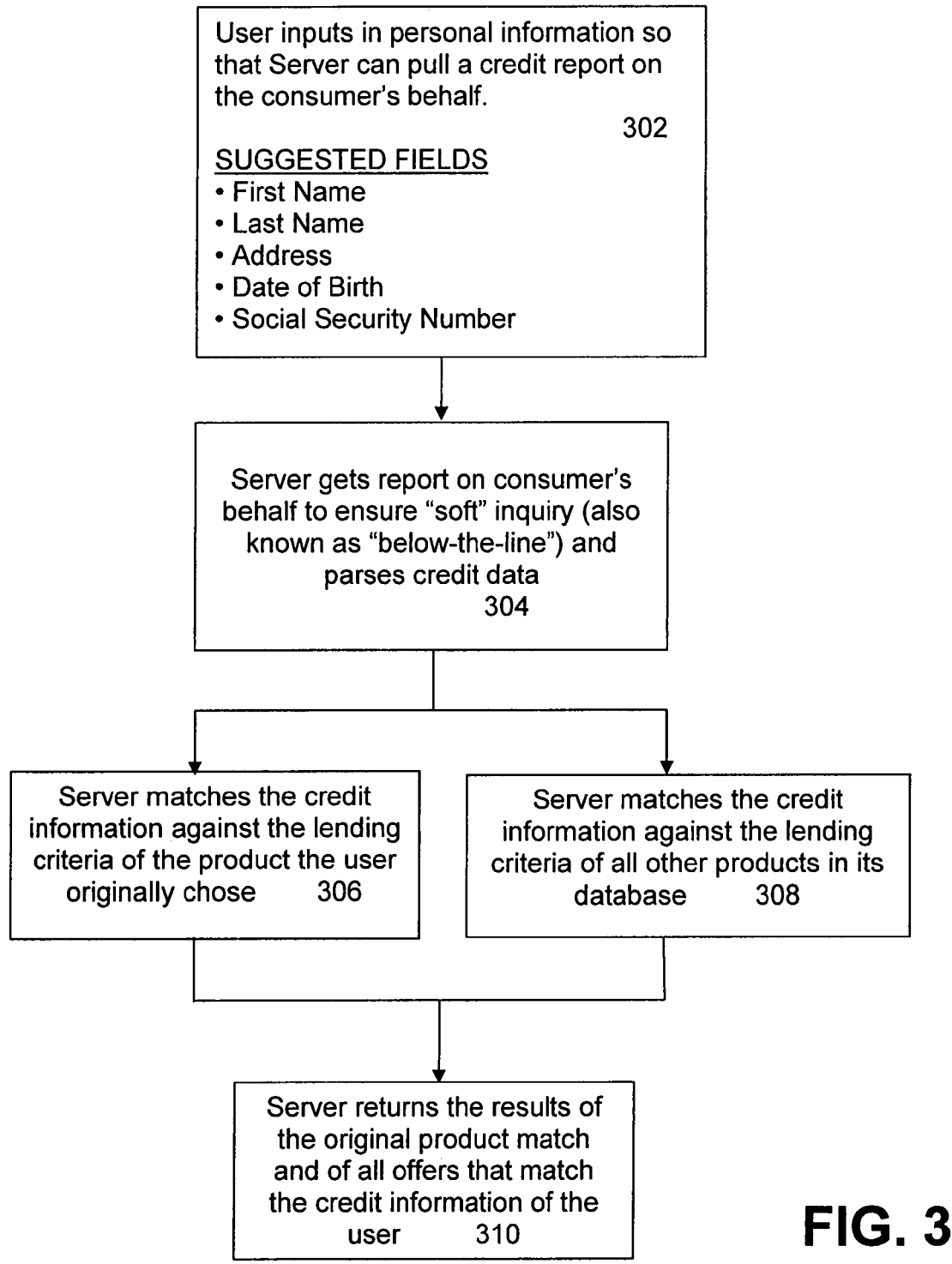
FIG. 3 is a flowchart that illustrates a method of matching available loan products to credit score information for a user, according to an embodiment.
Figure 4:
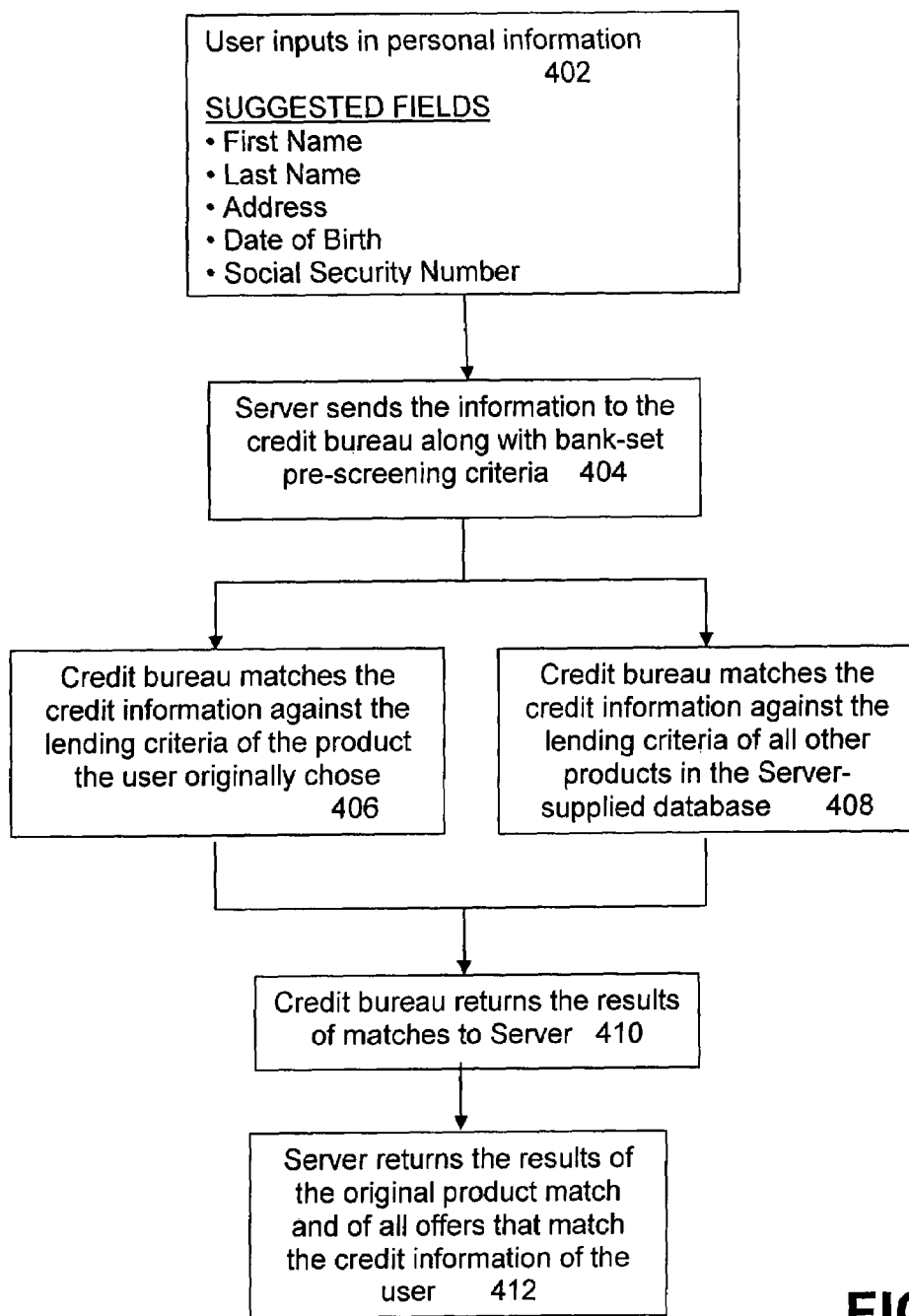
FIG. 4 is a flowchart that illustrates a method of matching available loan products to credit information for a user, according to an alternative embodiment.

FIG. 3 is a flowchart that illustrates a method of matching available loan products to credit score information for a user, according to an embodiment. In block 302 the user inputs certain items of personal information, such as name, address, date of birth and any other uniquely identifying items of information. The user's social security number may or may not be required depending upon the requirements of the service that provides the credit score. In block 304, the server receives the user's consumer report on the user's behalf. This is done in a manner that attempts to ensure that the user's credit score is not impacted. In general, the more frequent a user's credit score is accessed, the greater the likelihood that the credit score will be reduced. This is due to certain access practices imposed by services that provide credit score and credit reporting information. A so-called "soft" or "below-the-line" inquiry constitutes a credit report pull that does not negatively impact the user's credit score. Once the credit report is obtained, the relevant credit data and score is parsed out.

Once the server has the user's credit score, or other pertinent credit information, it matches this information against the lending criteria for the loan product that the user originally selected, block 306. It also matches this information against the lending criteria for other products in the database, block 308. The server then returns the results of the original product match and all other offers that might match the credit score or information of the user, block 310.

For the embodiment of FIG. 3, a soft inquiry was performed by the server on the user's behalf. In certain circumstances, such a soft inquiry is not possible or practical, and a credit bureau or similar organization must be used to obtain the credit report information. FIG. 4 is a flowchart that illustrates a method of matching available loan products to credit information for a user, according to an alternative embodiment in which a credit bureau is used. In block 402 the user inputs certain items of personal information, such as name, address, date of birth and any other uniquely identifying items of information. The user's social security number may or may not be required depending upon the requirements of the credit bureau that provides the credit score. In block 404, the server transmits the user information to a credit bureau along with a defined set of pre-screening criteria. This pre-screening criterion typically comprises criteria defined by a bank or financial institution. Once the credit report is obtained, the credit bureau matches this information against the lending criteria for the loan product that the user originally selected, block 406. It also matches this information against the lending criteria for other products in the database, block 408. The credit bureau then returns the results of the matches to the server, block 410. In block 412, the server returns the results of the original product match and all other offers that might match the credit score or information of the user.

Figure 5:
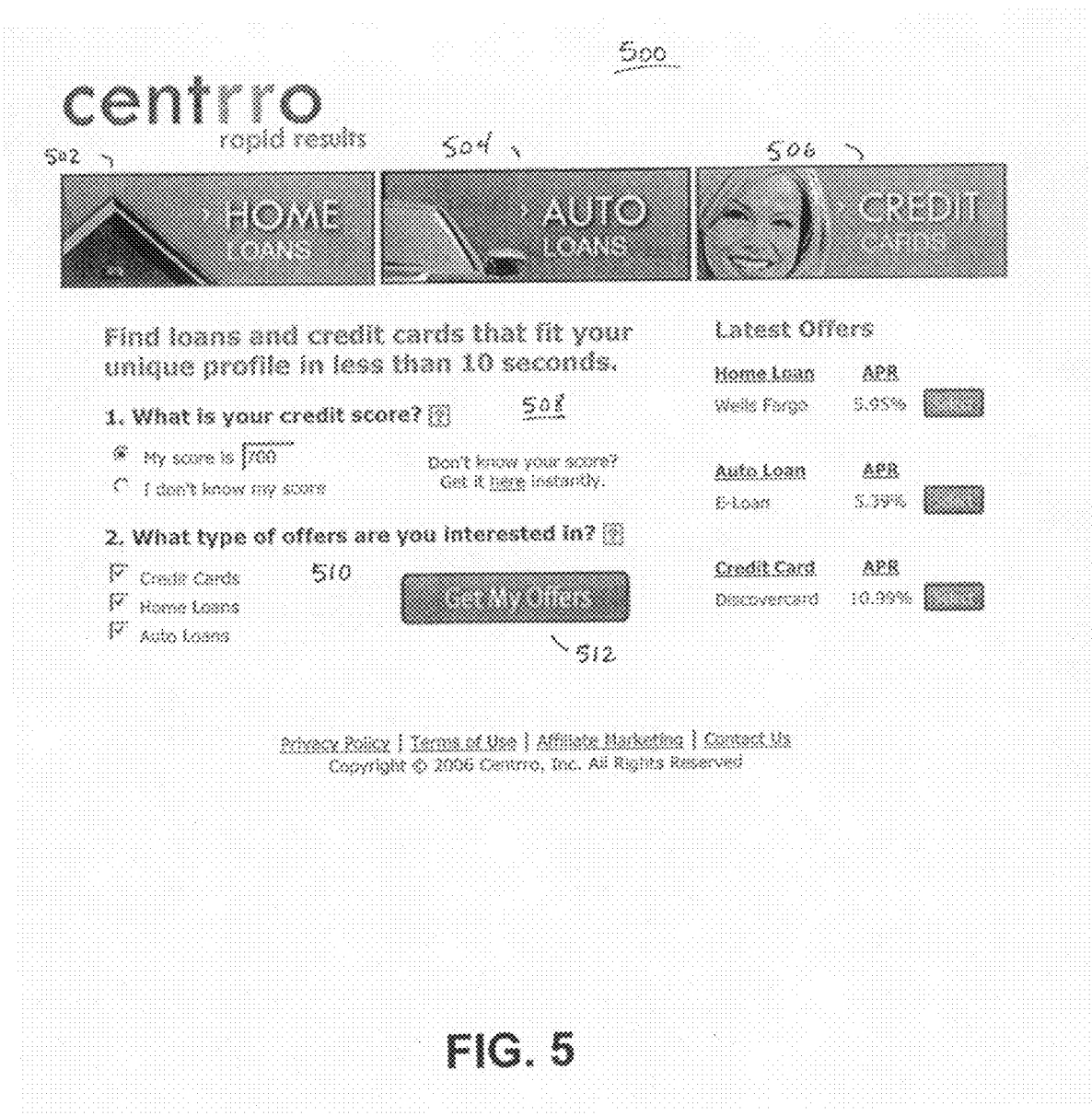
FIG. 5 illustrates an example of a web page for finding loans or credit offers, according to an embodiment.

In one embodiment, the network 110 is the Internet, and server 104 executes a web server process 116 to allow users to access the online credit application process 112 through a web based interface through client-side web browsers 114. As shown in block 202 of FIG. 2, the user starts the loan application process by selecting the loan product or products that he is interested in. This selection is usually done through a web page displayed through the web browser of the user's client computer. FIG. 5 illustrates an example of a web page for finding loans or credit offers, according to an embodiment. Web page 500 represents the initial web page that is displayed by the online credit application process 112. It provides an access point for all of the loan products available through server 104. For the embodiment of FIG. 5, the loan products are organized by loan type, thus the user is able to apply for a home loan 502, a car loan 504, or a credit card 506. Many other loan products or even sub-categories of loan types (e.g., first mortgages, re-finances, etc.) may also be provided.

The user is prompted to input their credit score in display area 508 of the web page 500. If the user does not know his or her score, the server provides a mechanism in which it can access the score or utilize a credit bureau to obtain the score, as described with reference to FIGS. 3 and 4. The user may specify which type or types of loan products to be applied for in display area 510. Once all of the relevant information is provided, the user proceeds with the online loan application process by selecting button 512.

Once the user provides the relevant information and loan product selection, the server searches its database and displays the possible products, as shown in block 204 of FIG. 2. This is provided to the user in the form of a responsive web page. FIGS. 6A and 6B illustrate an example of a web page listing possible loans for a credit score of 700, according to an embodiment. Web page 600 contains several display fields that outline the possible loan products based on the user's input credit score, or the credit score obtained on the user's behalf. In section 602, the user can enter a different credit score, in cases where the user made a mistake or the user is interested in seeing what type of loan products are available for different credit scores. For the example entry of FIGS. 5, the user selected three types of loan products. Thus, in web page 600, a selection of home loans is shown in display area 604, a selection of auto loans is displayed in display area 606, and a selection of credit cards is displayed in display area 608. If several loan products are available, only the top loans per type may be displayed at any one time. Alternatively, depending upon the constraints of the display system, all possible products may be displayed on the web page. Each possible loan product can be selected using a corresponding selection button, 610.

Depending upon a user's credit score, the number of loan products may vary. In general, fewer loan products are available to users with lower credit scores, and such loan products tend to be more expensive (in terms of interest rate or fees) or restrictive. FIG. 5 illustrates an example of loan product offerings for a person with a credit score of 700, while FIG. 10 illustrates an example of an example of possible loan products for a person with a credit score of 550. As can be seen in FIG. 10, only a small number of loans are available and at a higher interest rate than the products offered to persons with a credit score of 700.

Figure 7:
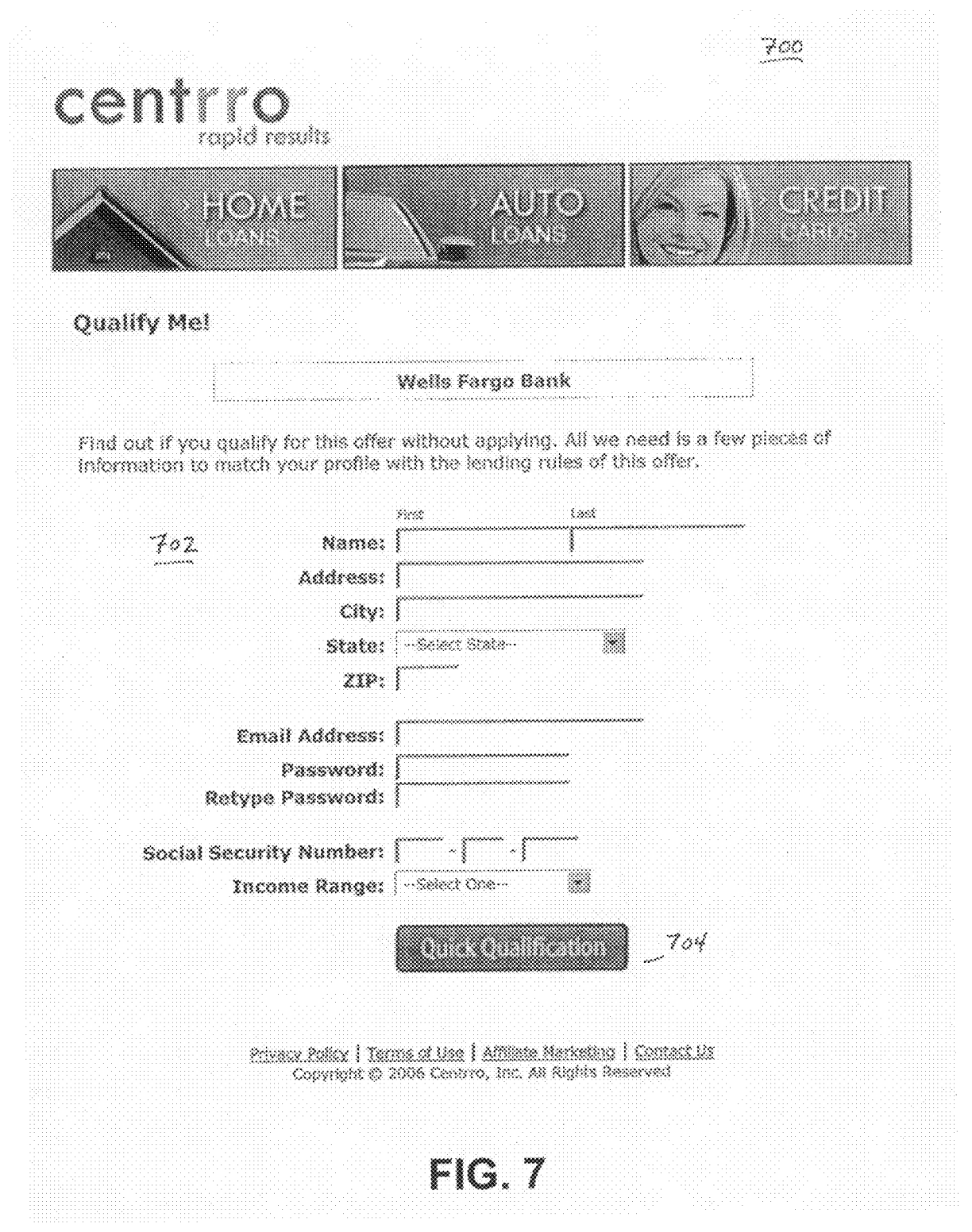

When the selection button for a particular loan product is selected, the server causes a qualification page to be displayed, which allows the user to find out whether or not they actually qualify for the loan product that they have selected. FIG. 7 illustrates an example of a qualification web page for a loan product listed in FIG. 6A, according to an embodiment. The qualification page 700 provides a means for a user to verify qualification without actually applying for the product. Display area 702 provides data entry windows for the user to enter relevant personal information related to the application and qualification for the loan product. These include identifying information, such as name, address, social security number, and so on, as well as financial information, such as annual income, and so on. Once the pertinent information has been entered, the user can select the qualification button 704 to receive the results of the qualification test.

As shown in the process flow of FIG. 2, if the user is not qualified for the selected loan product, a list of loan products that the user may be qualified for is displayed. If the user is qualified for the selected loan product, a loan application page is displayed. FIG. 8 illustrates an example of an application web page for the loan product illustrated in FIG. 7. As shown on web page 800, the success page includes an application command button 802 that allows the user to apply for the selected loan. This transports the user to the lender's website, where the user can then go through the actual loan application process. The success page 800 may also include a list of other loan products that the user is qualified to apply for, such as shown in display area 804.

In one embodiment, the online credit application process 112 can provide access to lenders websites directly to allow users to select loan products through the lender sites. FIGS. 9A and 9B illustrate an example of a web page for the vendor of a loan product, under an embodiment. Web page 900 illustrates a typical loan application page for a vendor, and shows data entry areas for the relevant user information and loan product information required by the vendor. The web page of FIGS. 9A and 9B are intended to illustrative and many different formats are possible depending upon the vendor.

For the process flow illustrated in FIG. 2, the online loan application process was initiated by the server receiving from the user, or obtaining from a credit bureau, actual credit score information for the user. In most cases, such an inquiry could constitute a credit pull that might affect the user's credit score. Such a process could also be relatively expensive, as credit bureaus and credit reporting services may charge a not insignificant amount of money per credit pull. In an alternative online credit application process, the user does not provide an actual credit score, but rather a qualitative measure or range of his or her credit worthiness.

Figure 11:
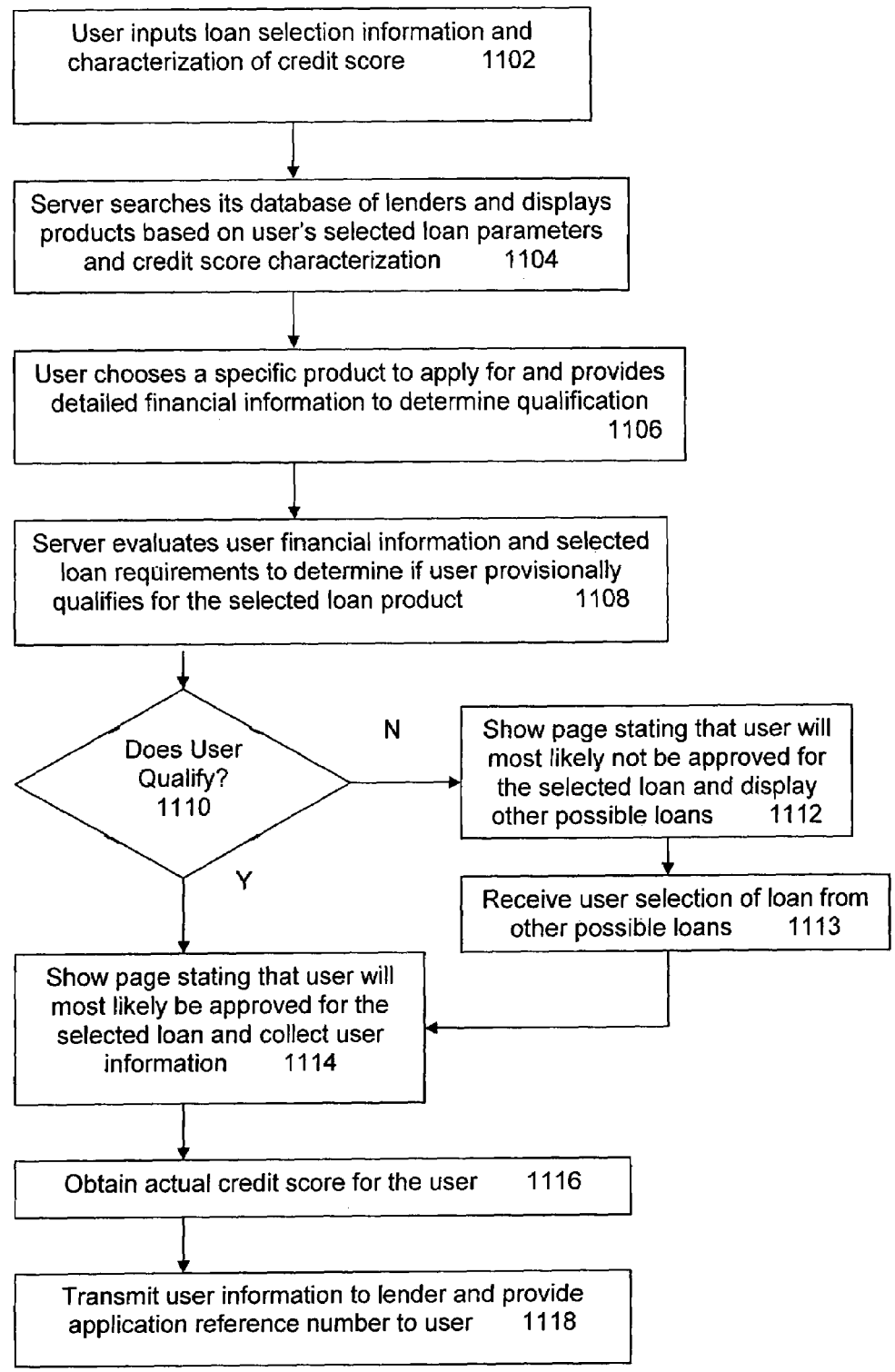
FIG. 11 is a flowchart that illustrates a method finding and displaying loan products for a user, according to an alternative embodiment in which indirect credit information is used to access available loan products.

FIG. 11 is a flowchart that illustrates a method finding and displaying loan products for a user, according to this alternative embodiment. For the embodiment of FIG. 11, an alternative type of loan application form is displayed on the client computer. This loan application form solicits information from the user regarding loan parameters, such as type and amount of loan desired. In block 1102, the user inputs loan selection information that indicates the type, purpose and amount of loan desired. The user also provides a qualitative measure or characterization of his or her credit score. Such a characterization could be a selection from the range POOR-FAIR-GOOD-EXCELLENT; it could be a letter grade, e.g., A-F, or a numeric value, e.g., 1-10, and so on. The online credit application process 112 on server 104 searches its databases of lenders and displays products available on the user's choice and eligibility based on the type of loan and user's credit score characterization, block 1102. The user then selects a specific loan product to apply for, and at this point provides detailed financial information about the user, block 1106.

In block 1108 the server evaluates the financial information and the selected loan requirements to determine if the user provisionally qualifies for the selected loan. If, in block 1110 it is determined that the user does not qualify for the selected loan product, a page stating probable non-approval with a selection of other possible loans is then displayed, as shown in block 1112. The user may choose to apply for another loan within this new selection of loans. If the user does select such a loan, the system receives the user selection of loans from the list of other possible loans, block 1113, and the process proceeds with block 1114.

If, in block 1110 it is determined that the user does likely qualify for the selected loan product, the server displays a success page stating that the user will most likely be approved for the loan offer, block 1114. This page also provides input areas for the user to provide detailed user information so that relevant credit information can be obtained, and the system collects the user provided information. This user information includes relevant identifying information, such as user name, address, date of birth, and social security number. In block 1116, the server uses the user identification information, including the social security number (if provided by the user) to obtain the actual credit score for the user. If the social security number is not provided, then the other identifying information is used. The server then transmits all of the relevant user and selected loan product information to the appropriate lender, and transmits an application reference number back to the user, block 1118.

Figure 12:
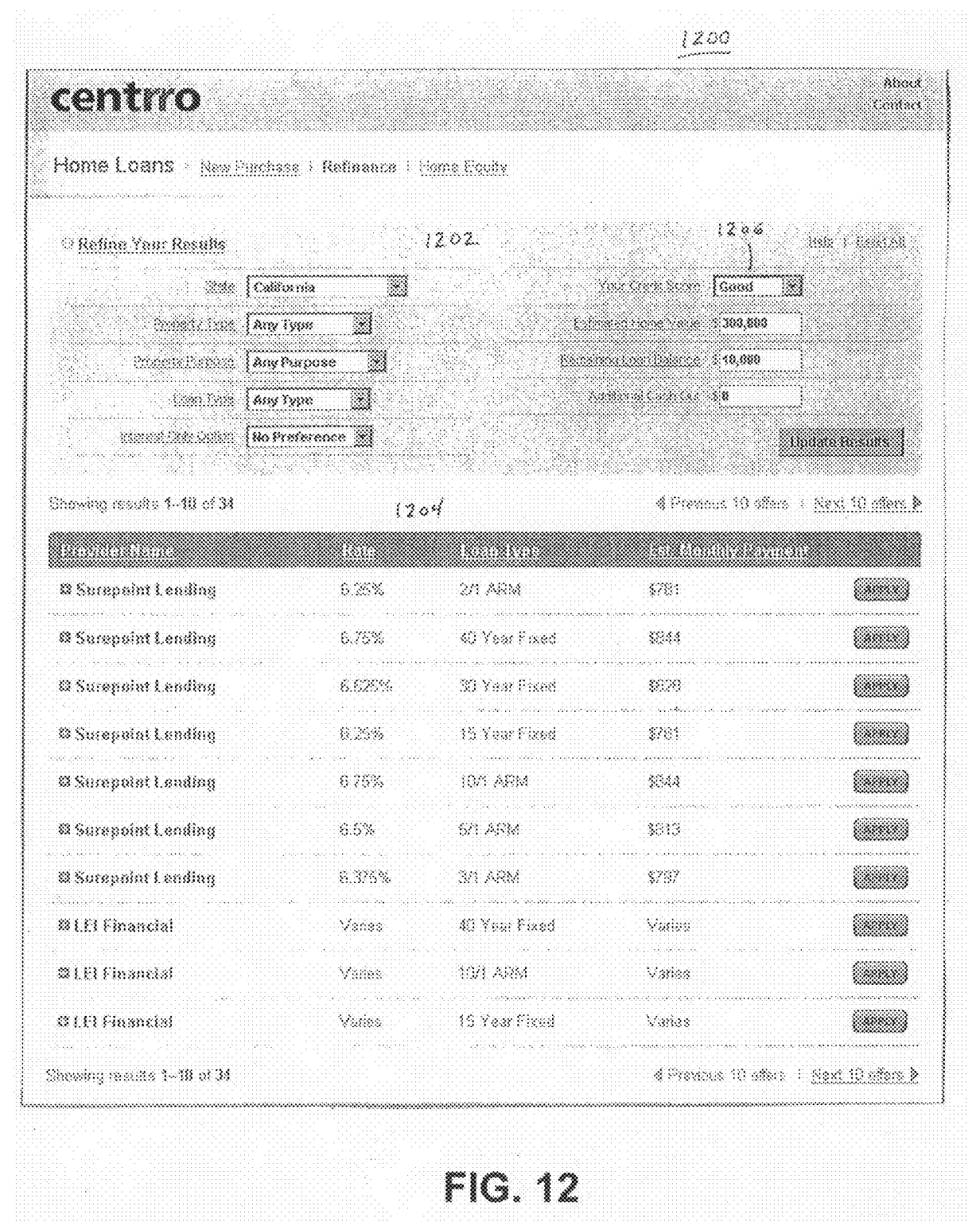

FIG. 12 illustrates an example of a web page for applying for and selecting loan products, according to an embodiment shown in the flow process of FIG. 11. As shown in block 1102, the user inputs loan selection information that indicates the type, purpose and amount of loan desired. Web page 1200 includes a number of data input fields 1202 for an example home loan. In this case, the user specifies the location, the type and purpose of the property. The user also inputs certain information regarding the cost of the property. In data input field 1206 the user provides a characterization of his or her credit score. The data entry field 1206 includes a pull-down menu that allows the user to choose one of a number of selections, such as poor, fair, good, or excellent. Each of these selections corresponds to a range of numbers within the total credit score range of 300 to 850. Using the characterization of the credit score, the online credit application process 112 is able to find and display a number of possible loan products based on the user information. A selection of possible loan products is displayed in display area 1204.

As shown in FIG. 12, each displayed loan product has a command button that allows the user to apply for a particular selected loan product. Once a loan is selected the process causes a loan qualification page to be displayed. FIG. 13 illustrates an example of a qualification web page for a loan product listed in FIG. 12, according to an embodiment. In display area 1302, the user provides certain detailed financial information. This financial information can include income and debt information, past payment and credit information, as well as any relevant information regarding the property (in the case of a real estate loan) and the desired loan. Once the user provides the required financial information, the process evaluates the user information and the loan requirements to determine the qualification of the user, as shown in block 1108 of FIG. 11.

If the user provisionally qualifies for the loan, the process provides displays an application page to the user. FIG. 14 illustrates an example of a loan application web page for this embodiment. The application web page includes several data entry areas 1402 for the input of various items of identification information for the user. These include name, address, and social security information. The online loan application process 112 then uses the user's personal information, including the social security number to obtain the actual credit score for the user. In one embodiment, the process queries one or more credit bureaus to obtain the credit score. Once the credit score or other relevant credit report information has been obtained, the process forwards the information to the lender or originator of the selected loan product. FIG. 15 illustrates an example of a confirmation page for a loan product under this embodiment. This page 1500 alerts the user that the information has been forwarded to the lender, and it provides a reference number 1502 for the application.

In one embodiment, the online loan application process also provides a user feedback mechanism, such as a forum, whereby users of the process can rate the lenders and/or loan products. The process provides a rating system that allows user to enter a numeric, or similar rating, or a descriptive evaluation of the lenders and products accessed through the system.

Embodiments of the online loan application system described herein may be applied to various types of loan or credit products, such as residential, consumer or mortgage loans, credit cards, rotating lines of credit, and the like. In general, the application for any such loan or credit product requires the lender to obtain a copy the user's credit report. Such a credit report is typically maintained and made available by credit bureaus such as Equifax™, Experian™, or Transunion™. When a user requests a credit report, the user's credit rating may be adversely affected. In general, multiple credit report pulls results in the lowering of a user's credit rating. Embodiments of the present invention allow a user to apply for loan or credit products in a manner that does not directly result in his or her credit report being pulled, and thus does not adversely affect the credit rating. This is accomplished by the user providing the system with his or her credit score directly, or having the credit bureau itself perform the match between the user credit score and the desired loan product and not sending the credit score out to the lender. Such "below the line" credit reporting protects the integrity of the user's personal information and does not adversely affect the credit score, because the credit report is not transferred out, thus the system administrator or any other third party does not take possession of the credit report.

Aspects of the online loan and credit application system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the method include: microcontrollers with memory (such as EEPROM), embedded microprocessors, firmware, software, etc. Furthermore, aspects of the described method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the online loan and credit application system is not intended to be exhaustive or to limit the embodiments to the precise form or instructions disclosed. While specific embodiments of, and examples for, the online loan and credit application system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the online loan application system in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the online loan application system may be presented in certain claim forms, the inventor contemplates the various aspects of the methodology in any number of claim forms. For example, while only one aspect of the system is recited as embodied in machine-readable medium, other aspects may likewise be embodied in machine-readable medium. Accordingly, the inventor reserves the right to add additional claims after filing the application to pursue such additional claim forms for other aspects of the described systems and methods.

What is claimed is:

1. A method comprising:
    on a client computer, displaying a solicitation page requesting user credit score information and a selection of desired loan products;
    obtaining the credit score for the user if the user does not provide the credit score in response to the solicitation;
    displaying on the client computer a list of available loans based on the credit score and the selection of desired loan products;
    receiving a selected loan from the selection of desired loan products; and
    requesting user identification information to verify user qualification for the selected loan and one or more other loan products that are available from a lender of the desired loan products, wherein the credit score is obtained through a below-the-line credit check from a credit bureau and then compared to the user credit score for the selected loan without transmitting the credit score to a lender of the desired loan products.

2. The method of claim 1 further comprising:
    evaluating the identification information;
    evaluating the selected loan qualification requirements as defined by a provider of the selected loan;
    making a provisional qualification determination based on the evaluation of the identification information and the selected loan qualification requirements; and
    transmitting the provisional qualification determination to the user.

3. The method of claim 2 further comprising, if the qualification determination is negative:
    transmitting a message to the user stating that the user is not qualified for the selected loan; and
    displaying a list of other possible loan products.

4. The method of claim 2 further comprising, if the qualification determination is positive:
    transmitting a message to the user stating that the user is most likely qualified for the selected loan; and
    providing access to the user to an application page provided by provider of the selected loan.

5. The method of claim 2 wherein the step of obtaining the credit score for the user comprises:
    soliciting user identification information, said user identification consisting at least of user name, address, date of birth and social security number.

6. The method of claim 2 further comprising:
    soliciting user identification information, said user identification consisting at least of user name, address, date of birth and social security number;
    transmitting the user identification information to a third party credit bureau;
    transmitting pre-screening information provided by the provider of the selected loan; and
    receiving a loan qualification determination provided by the third party credit bureau based on an evaluation by the third party credit bureau.

7. The method of claim 1 further comprising obtaining from the user, in the solicitation page, a qualitative measure of his or her own credit worthiness.

8. The method of claim 7 wherein the qualitative measure of the user's own credit worthiness comprises a descriptive characterization selected from a range of possible characterizations.

9. A method comprising:
    receiving a user request to apply for a loan;
    displaying, in response to the user request, on a client computer a web page soliciting user input of information regarding the loan;
    receiving from the user a qualitative measure of his or her own credit worthiness;
    displaying on the client computer a list of available loans based on the loan information provided by the user and the qualitative measure of credit worthiness;
    receiving a loan selection from the user;
    soliciting detailed financial information from the user to determine if the user provisionally qualifies for the selected loan based on defined lending criteria, or one or more other loan products that are available from a lender of the available loans based on the qualitative measure of credit worthiness; and
    verifying the user's credit score through a third party credit bureau through a below-the-line credit check wherein the credit score is obtained through a below-the-line credit check from a credit bureau and then compared to the user credit score for the selected loan without transmitting the credit score to a lender of the desired loan products.

10. The method of claim 9 wherein the qualitative measure of the user's own credit worthiness comprises a descriptive characterization selected from a range of possible characterizations.

11. The method of claim 9 further comprising:
    if the qualification determination is negative, transmitting a message to the user stating that the user is not qualified for the selected loan, and displaying a list of other possible loan products; and
    if the qualification determination is positive, transmitting a message to the user stating that the user is most likely qualified for the selected loan, and soliciting identifier information regarding the user.

* * * * *